Nov. 12, 1929.  Y. KIKUCHI  1,735,685
TRANSMISSION
Filed Jan. 25, 1929
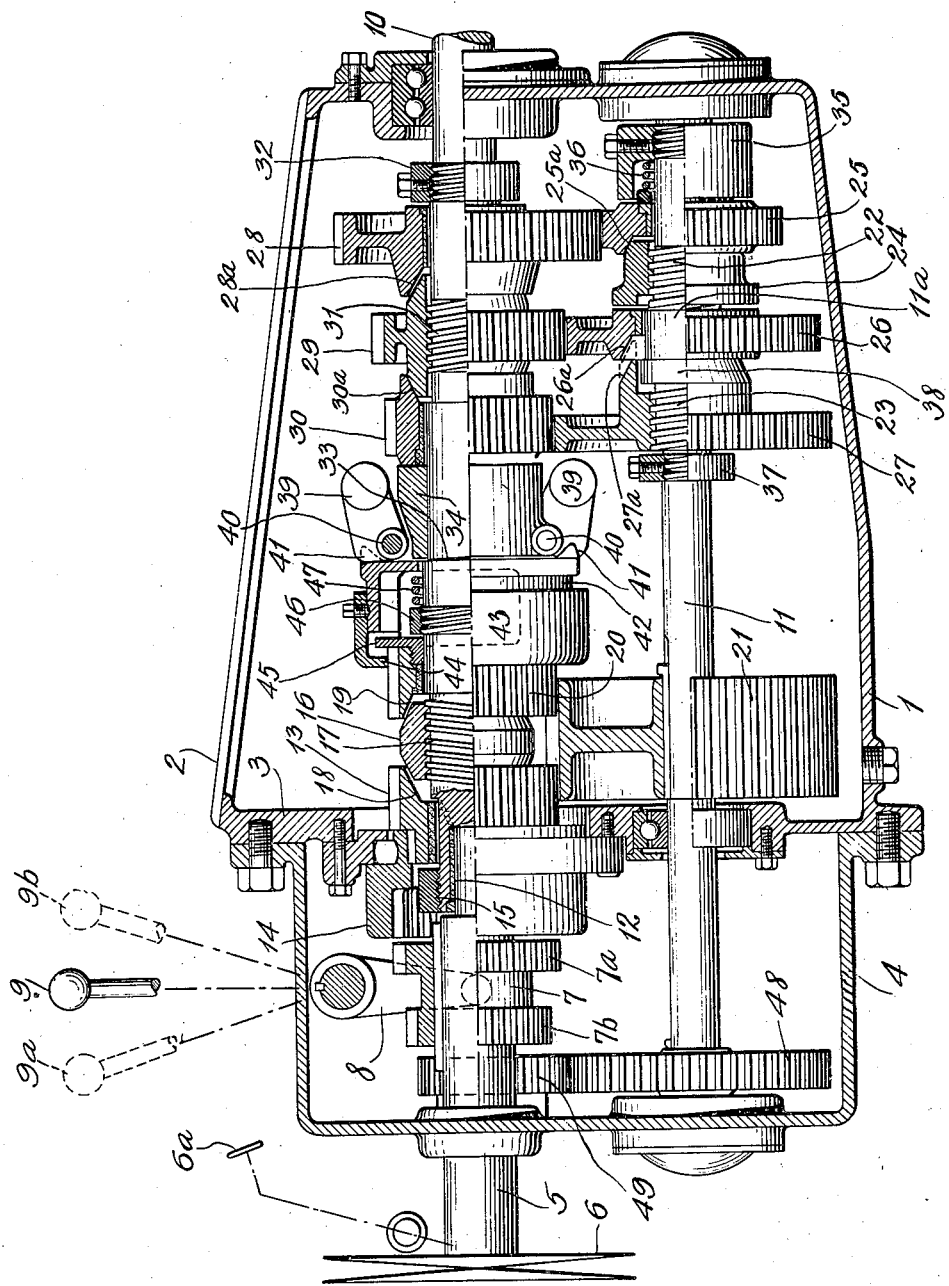
INVENTOR.
Yukio Kikuchi
BY
ATTORNEYS.

Patented Nov. 12, 1929

1,735,685

UNITED STATES PATENT OFFICE

YUKIO KIKUCHI, OF MONTCLAIR, NEW JERSEY

TRANSMISSION

Application filed January 25, 1929. Serial No. 334,919.

This invention relates to transmissions and particularly to what may be termed automatic or semiautomatic transmissions employing a plurality of forward drives in conjunction with a reverse drive; and the object of the invention is to provide a transmission of the class specified having means for maintaining the gearing in three different positions, namely, neutral, forward and reverse, and means whereby when the gearing is in forward position, the first, second and third speeds will automatically be put into operation in the propulsion of a vehicle or member to be driven; a further object being to provide a main driven shaft in axial alinement with the engine driven shaft and a supplemental driven shaft in parallel relation to the main shaft with means operated through a manual control for regulating the forward and reverse drives of the main and supplemental shafts; a further object being to provide three sets of gear units, one gear in each set being arranged on each of the main and supplemental shafts and the separate sets controlling the several drives of the shaft and the gears of said units having clutch faces cooperating with each other and with clutch elements to control the variable speed drives; a still further object being to provide means involving a governor controlling the direct or high speed drive of the transmission; and with these and other objects in view, the invention consists in an apparatus of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters and in which:—

The drawing is a sectional view through my improved transmission, part of the gears and clutch elements being shown in elevation.

In the construction shown, my improved transmission comprises a casing 1, the top of which is shown open and adapted to be closed by a cover 2, the opening being sufficiently large to receive the several gear and clutch elements in making the assemblage. To one side of wall 3 of the casing is attached a supplemental casing 4. The engine driven shaft 5 which is placed in operative connection with the engine shaft through a suitable clutch 6 controlled by a foot pedal indicated at $6^a$ extends into the supplemental casing 4. Keyed thereto and slidable longitudinally thereof is a gear clutch 7 having gear elements $7^a$ and $7^b$ between which is a recess for receiving the clutch operating arm 8 actuated through the hand lever 9 to move the clutch into three distinct positions, namely, neutral, forward and reverse.

Mounted in suitable bearings in the casing 1 is a main driven shaft 10 which is in operative engagement with the drive wheels of a vehicle or any other member or element to be driven, and a supplemental driven shaft 11 is also arranged in suitable bearings in the casing 1 and also in the casing 4.

The inner end of the shaft 10 is recessed and provided with a bushing to receive a reduced end on the shaft 5 as clearly seen at 12. This maintains the shafts 5 and 10 in common alinement and further provides for the support of the inner end of the shaft 5. Rotatably mounted on the inner end of the shaft 10 is a gear 13 to which is keyed a clutch part 14 in connection with which the gear face $7^a$ of the clutch operates, the part 14 having an internal gear surface with which the gear $7^a$ is adapted to mesh, and a nut 15 on the shaft 10 serves to hold the gear 13 against displacement.

A clutch element 16 is mounted upon a screw threaded portion 17 on the shaft 10 and has on its opposite sides, beveled clutch faces, one of which is adapted to cooperate with a beveled clutch face 18 on the gear 13, and the other with a beveled face 19 on a corresponding gear 20, freely rotatable on the shaft 10 and of the same dimensions as the gear 13, both gears 13 and 20 meshing with a wide faced gear 21 keyed to the supplemental shaft 11.

Mounted on the supplemental shaft 11 are two screw threaded surfaces 22 and 23, and mounted on one of said surfaces is a clutch element 24 disposed between two gears 25 and 26, whereas a gear 27 is mounted upon the screw threaded surface 23.

The gears 25, 26 and 27 are in operative engagement with gears 28, 29 and 30 mounted upon the shaft 10, the gear 29 engaging the shaft 10 through a screw threaded portion 31, and serving as a clutch element in that it has on opposite sides, beveled clutch faces adapted to cooperate with a beveled clutch face $28^a$ on the gear 28, and a beveled clutch face $30^a$ on the gear 30.

In the operation of the transmission, the gear 28 is backed off by a nut 32 secured to the shaft 10 whereas the backing for the gear 30 is formed by the shoulder 33 on said shaft through the medium of the governor collar 34, later described.

The clutch 24 has at one side a beveled clutch face adapted to cooperate with a clutch face $25^a$ on the gear 25, the other side of the clutch having a straight surface in connection with which a straight face on the gear 26 operates, the opposite side face of said gear being beveled as seen at $26^a$ to cooperate with the adjacent beveled face $27^a$ on the gear 27. The gear 25 is backed up by a tubular nut 35 within which is arranged a spring 36 which normally serves to maintain the beveled face $25^a$ of the gear 25 in engagement with the clutch 22. A nut 37 secured to the shaft 11 limits the movement of the gear 27 in one direction, and serves as a backing therefor, a collar 38 on the shaft 11 limiting the movement of the gear 27 in the opposite direction.

The governor device which I employ involves in conjunction with the collar 34, two weighted governor arms 39 pivoted to the collar 34 as seen at 40 and having cam surfaces 41 adapted to operate in connection with a sleeve 42 carrying another sleeve 43 secured thereto, the latter sleeve having an inturned flange 44 at its free side adapted to operate in connection with a collar 45 secured to the gear 20. The free side of the sleeve 42 also operates in connection with the collar 45 to advance the gear 20 in the direction of the clutch 17. A nut 46 is secured to the shaft 10 within the sleeve 42 and serves to limit the movement of the gear 20 in one direction and also as a backing for a spring 47 which serves to normally hold the beveled surface $30^a$ of the gear 30 in engagement with the beveled face of the gear 29.

A gear 48 is secured to the shaft 11 within the casing 4, and meshes with a gear 49 arranged on a stub shaft supported in the casing 7, the gear $7^b$ of the clutch 7 being adapted to operate in connection with the gear 49 in the reverse drive of the transmission as will be apparent.

As above stated, all of the shafts having suitable bearings in the respective casings 1 and 4 and these may be of the ball or roller type. When the parts are in neutral position as seen in the accompanying drawing, if it is desired to move the transmission into forward drive position and to automatically increase the speed of the member to be driven, I proceed as follows:

The lever 9 is moved forwardly into the position indicated in dotted lines at $9^a$ to move the gear $7^a$ of the clutch into engagement with the internal gear on the part 14, this operation being performed when the engine shaft is uncoupled with the shaft 5 through the clutch 6. This coupling is then completed, and it will be seen that the supplemental shaft 11 will be driven through the gears 13—21, the gear 27 will be moved to the right by virtue of the resistance of the driven member including the shaft 10 and gear 30, the latter gear being in engagement with the gear 29. When the gear 27 strikes the collar 38, the gear 30 will be driven by the gear 27 causing the gear 29 to be rotated and fed longitudinally of the shaft 10 into engagement with the gear 28. At the same time, the clutch 24 which is normally in engagement with the gear 25 will move to the right, securely coupling the gear 25 with the shaft 11, which will cause the shaft 10 to be driven at first or low speed through the gears 25, 28 and 29, it being understood that the gear 28 is securely coupled with the shaft 10 through the interengaging clutch faces on the gears 28 and 29, the collar 32 acting as a backing for the gear 28.

In shifting to second speed as the momentum of the driven member or members, for example the drive wheels of a vehicle, is increased, the engine is retarded slightly which will cause the clutch 24 to be moved to the left and into engagement with the gear 26 due to the momentum of the driven member or members and the retarded driving action of the shaft 11.

This movement brings the gear 26 or its beveled face $26^a$ into engagement with the beveled face $27^a$ of the gear 27, completing the coupling with the shaft 11 and causing the shaft 10 to be driven through the gears 26, 29 and 28 with the ratio of gearing governed by the gears 26 and 29.

In the above described operation of second speed drive, the gear 30 has a slight frictional engagement with the gear 29 through the interengaging clutch faces, and thus the collar 34 of the governor has a frictional engagement with the gear 30 through the action of the spring 47, and as the speed of the driven member is increased and the governor weights 39 moved outwardly by centrifugal force, the automatic movement into third or high speed is accomplished as follows.

The gear 20 will be moved into engagement with the clutch 16 through the action of the governor and governor sleeve 42, and this engagement will cause the clutch 16 to be moved into engagement with the gear 13, completing the coupling of the gear 13 directly with the shaft 10 for the direct or high speed drive. This drive will also take place through the gears 29 and 30, it being understood that the gear 29 is fed to the left into engagement with the gear 30, the latter being backed off by the engagement of the collar 34 with the shoulder 33.

To shift from high to second or low speed, the engine is retarded which will cause the clutch 16 to move to the right or out of engagement with the gear 13, by reason of the momentum of the shaft 10. and the driven member or members may then be operated from the second or first speeds in the manner above set forth.

In order that the foregoing operations may be more clearly understood, I submit the following. In the shift of the transmission from second to high speed, as the second speed drive increases, the frictional engagement of the governor collar 34 with the gear 30 which is being rotated through the gear 27 will cause the gear 20 to move to the left, the latter gear being rotated at a greater speed than the shaft 10 is propelled at a second speed drive, causing the movement of the clutch 16 to the left into engagement with the gear 13, completing the direct coupling of the shaft 5 with the shaft 10. As soon as this coupling is established, the shaft 10 will then be driven at a greater speed than the gear clutch 29 causing the latter to move on the screw thread 31 to the left to complete the coupling between it and the gear 30, and at the same time, the gear 27 will be secured to the shaft 11 and its engagement with the gear 26 broken.

In moving from first to second speed drive, the instant the gears 26 and 27 are coupled together and secured to the shaft 11 and the drive is established through said gears and the gears 28 and 29, it will be seen that the gear 25 will be rotated at a greater speed than the gear 26 as well as the shaft 11, thus causing the clutch 24 to be maintained in firm and frictional engagement with the gear 26 at all times during the second speed drive, the spring 36 serving to hold the gear 25 in engagement with the clutch 24 in this operation. There will also be frictional engagement between the beveled surfaces of the gear 25 and clutch 24.

By shifting the lever 9 into the position shown in dotted lines at $9^b$, the clutch 7 or its gear $7^b$ will move into engagement with the gear 49 which will reverse the driving of the shaft 11 from the gear 48 and the shaft 10 will be driven through the gears 27, 30 and 29. The gear 27 is locked to the shaft 11 by engagement with the collar 37, and the reverse drive to the shaft 10 causes the gears 29 and 30 to be locked on said shaft 10.

In the reverse drive, it will be noted that the clutch 24 will be fed to the left but this movement is stopped by engagement with the shoulder $11^a$ on the shaft 11 so that the gear 26 will not be moved into engagement with the gear 27. In this drive, the gears 25 and 28 remain idle.

From the foregoing, it will be apparent that to actuate a driven member or members, such for example in the operation of a motor vehicle, all that is necessary for the operator to do in propelling a vehicle forwardly, is to move the lever 9 into its forward drive position and to proceed to operate the vehicle through the several speeds in the manner above stated, requiring the slipping of the clutch 6 or retarding the engine operation in making the shifts and the reverse drive is brought about by moving the lever 9 into reverse position. A transmission of this class will eliminate considerable labor in connection with the operation of vehicles of various kinds and classes, and will provide a substantially all automatic variable speed drive.

While I have shown certain details of construction for carrying my invention into effect and have illustrated a specific arrangement of gears and gear ratios, it will be understood that my invention is not necessarily limited in these respects, and various changes in and modifications of the construction herein shown and described may be made within the scope of the appended claims without departing from the spirit of my invention or sacrificing its advantages.

What I claim as new and desire to secure by Letters Patent, is:—

1. An automatically actuated gear transmission of the class described involving a main shaft and a supplemental shaft, a plurality of gear units, each unit involving two gears and one gear of each unit being arranged on the separate shafts, the gears of the separate and adjacent units on the respective shafts having interengaging clutch faces, a gear of one unit on the main shaft being in screw threaded engagement therewith, and a gear of another unit being in screw threaded engagement with the supplemental shaft.

2. An automatically actuated gear transmission of the class described involving a main shaft and a supplemental shaft, a plurality of gear units, each unit involving two gears and one gear of each unit being arranged on the separate shafts, the gears of the separate and adjacent units on the respective shafts having interengaging clutch faces, a gear of one unit on the main shaft being in screw threaded engagement therewith and a gear of another unit being in screw threaded engagement with the supplemental shaft, and a clutch element interposed between two of the gears on the supplemental shaft and in screw threaded engagement with said supplemental shaft.

3. An automatically actuated gear transmission of the class described involving a main shaft and a supplemental shaft, a plurality of gear units, each unit involving two gears and one gear of each unit being arranged on the separate shafts, the gears of the separate and adjacent units on the respective shafts having interengaging clutch faces, a gear of one unit on the main shaft being in screw threaded engagement therewith and a gear of another unit being in screw threaded engagement with the supplemental shaft, a clutch element interposed between two of the gears of the supplemental shaft and in screw threaded engagement with said supplemental shaft, a clutch element in screw threaded engagement with the main shaft, and means involving a governor device for moving said clutch element into position to provide a direct coupling of the main shaft with the power shaft.

4. An automatically actuated gear transmission of the class described involving a main shaft and a supplemental shaft, a plurality of gear units, each unit involving two gears and one gear of each unit being arranged on the separate shafts, the gears of the separate and adjacent units on the respective shafts having interengaging clutch faces, a gear of one unit on the main shaft being in screw threaded engagement therewith and a gear of another unit being in screw threaded engagement with the supplemental shaft, a clutch element interposed between two of the gears of the supplemental shaft and in screw threaded engagement with said supplemental shaft, a clutch element in screw threaded engagement with the main shaft and means involving a governor device for moving said clutch element into position to provide a direct coupling of the main shaft with the power shaft, and means involving a manually operated clutch for controlling the forward, reverse and neutral positions of the transmission.

5. An automatic gear transmission of the class described comprising a plurality of automatically interchangeable gear units, each unit comprising two gears, one of said gears being disposed on a main driven shaft and the other on a supplemental shaft, and means on the gears of said units and disposed between adjacent faces thereof and including means on said shaft for producing automatic speed shifting to increase or decrease the speed of propulsion of said main shaft, said means including stops on the respective shafts for limiting the movement of said gears in one direction and also including tensional means for supporting predetermined gears normally in engagement with adjacent members on the respective shafts.

6. An automatic gear transmission of the class described comprising a plurality of automatically interchangeable gear units, each unit comprising two gears, one of said gears being disposed on a main driven shaft and the other on a supplemental shaft, and means on the gears of said units and disposed between adjacent faces thereof and including means on said shaft for producing automatic speed shifting to increase or decrease the speed of propulsion of said main shaft, said means including stops on the respective shafts for limiting the movement of said gears in one direction and also including tensional means for supporting predetermined gears normally in engagement with adjacent members on the respective shafts, and means involving a governor device and a clutch element in threaded engagement with one of said shafts and actuated by said governor device for automatically producing a direct coupling of the main shaft with the power shaft.

7. A transmission of the class described comprising a main driven shaft, a supplemental shaft arranged in parallel relation to the driven shaft, a power driven shaft in axial alinement with the main shaft, a clutch keyed to and movable longitudinally of the power shaft, means on the main shaft engaged by said clutch in one position and in operative engagement with the supplemental shaft for causing said supplemental shaft to be rotated, and three sets of gear units, one gear of each unit being arranged on the main and supplemental shafts, and the gears on each shaft involving interengaging clutch faces, a clutch element on the driven shaft, and automatically actuated means including the last named clutch element and the interengaging clutch faces of said gears for controlling and regulating the automatic shifting of the transmission.

8. A transmission of the class described comprising a main driven shaft, a supplemental shaft arranged in parallel relation to the driven shaft, a power driven shaft in axial alinement with the main shaft, a clutch keyed to and movable longitudinally of the power shaft, means on the main shaft engaged by said clutch in one position and in operative engagement with the supplemental shaft for causing said supplemental shaft to be rotated, and three sets of gear units, one gear of each unit being arranged on the main and supplemental shafts, and the gears on each shaft involving interengaging clutch faces, a clutch element on the driven shaft, and automatically actuated means including the last named clutch element and the interengaging clutch faces of said gears for controlling and regulating the automatic shifting of the transmission, and means involving a chain of gears on said first named clutch for controlling the reverse drive of the driven shaft.

In testimony that I claim the foregoing as my invention I have signed my name this 22nd day of January, 1929.

YUKIO KIKUCHI.